(12) United States Patent
Tabb et al.

(10) Patent No.: US 11,232,158 B2
(45) Date of Patent: Jan. 25, 2022

(54) SINGLE VIEW PRESENTATION OF MULTIPLE QUERIES IN A DATA VISUALIZATION APPLICATION

(71) Applicant: Google LLC, Mountain View, CA (US)

(72) Inventors: Lloyd Tabb, Santa Cruz, CA (US);
Steven Talbot, Santa Cruz, CA (US);
Michael Toy, Los Altos, CA (US); Wil Gieseler, San Francisco, CA (US);
Colin Zima, San Francisco, CA (US);
Julian Hyde, Berkeley, CA (US)

(73) Assignee: Google LLC, Mountain View, CA (US)

( * ) Notice: Subject to any disclaimer, the term of this patent is extended or adjusted under 35 U.S.C. 154(b) by 177 days.

(21) Appl. No.: 16/666,736

(22) Filed: Oct. 29, 2019

(65) Prior Publication Data
US 2021/0124781 A1 Apr. 29, 2021

(51) Int. Cl.
G06F 16/9038 (2019.01)
G06F 16/903 (2019.01)
G06F 16/901 (2019.01)

(52) U.S. Cl.
CPC ...... *G06F 16/9038* (2019.01); *G06F 16/9024* (2019.01); *G06F 16/90335* (2019.01)

(58) Field of Classification Search
None
See application file for complete search history.

(56) References Cited

U.S. PATENT DOCUMENTS 5,737,591 A * 4/1998 Kaplan ................. G06F 16/248
2006/0085445 A1 4/2006 Thanu 2006/0112123 A1 * 5/2006 Clark ...................... G06F 40/18
2009/0138427 A1 5/2009 Kalavade
2009/0327852 A1 12/2009 MacGregor et al.
(Continued)

FOREIGN PATENT DOCUMENTS

EP 3451154 A1 3/2019

OTHER PUBLICATIONS

Michael Blumendchein etal "SMARTexplore:Simplifying High-Dimensional Data Analysis through a Table-Based Visual Analytica Approach", IEEE Conference on Visual Analytics Science and Technology (VAST) Oct. 21-26, 2018, pp. 36-47.*
(Continued)

*Primary Examiner* — Uyen T Le
(74) *Attorney, Agent, or Firm* — Honigman LLP; Brett A. Krueger

(57) ABSTRACT

Embodiments of the present invention provide a method, system and computer program product for single view presentation of multiple query. In an embodiment of the invention, a method for single view presentation of multiple query includes directing a query against a database along a selected dimension of multiple different elements. In response, a primary result set is received. The result set is then organized into a tabular view of cells according to the selected dimension and values for the selected dimension. Thereafter, a set of nested queries may be directed for each of the elements in the selected dimension against the result set utilizing a different dimension. In response to each directed set of nested queries, a corresponding result set is thus received. Finally, each corresponding result set is inserted into a cell associated with a common one of the elements.

18 Claims, 3 Drawing Sheets

(56) References Cited

U.S. PATENT DOCUMENTS

2015/0178339 A1    6/2015  Ogievetsky
2015/0347528 A1*  12/2015  Jugel ................. G06F 16/24535
                                                              707/759
2016/0321589 A1*  11/2016  Powers .................. G06F 16/26
2017/0132286 A1*   5/2017  Baranczyk ........ G06F 16/24545
2019/0065014 A1*   2/2019  Richter .................. G06F 9/451
2019/0303405 A1*  10/2019  Kothari ............ G06F 16/24544

OTHER PUBLICATIONS

International Search Report, PCT/US2020/057703, dated Jan. 29, 2021, 12 pages.

* cited by examiner

SINGLE VIEW PRESENTATION OF MULTIPLE QUERIES IN A DATA VISUALIZATION APPLICATION

BACKGROUND OF THE INVENTION

Field of the Invention

The present invention relates to the field of data visualization and more particularly to the visualization of complex nested database queries.

Description of the Related Art

Data visualization refers to the graphical expression of one or more relationships between data in a collection of data. A most typical form of a collection of data is a database in which data is stored, and in many cases, managed by a separate application such as a database management system. The conventional database management system provides a programmatic user interface through which database queries may be received from other computing processes local or remote, and from which results to those queries may be provided to the querying computing processes.

A common form of a query selects a set of records in a database for consideration, a dimension, e.g. a primary field of interest in the set of records of the database, and a measure, e.g. a value for a corresponding secondary field of interest in a result set of records. Filtering and limiting criteria also may be specified in addition to a sorting directive as to how to sort a presentation of the result set of records, and aggregate functions operating upon the returned measures amongst the set of records returned in response to the query. Notably, different visualizations of the measure relative to the dimension may be provided including the venerable pie chart, line graph and bar chart visualizations.

As in the natural world, in most instances, a single query is not enough to answer a real-world question corresponding to the query. Rather, multiple queries are required. In many instances, each successive query amongst the multiple queries depends upon a result set of a prior query—thus the notion of a nest query in which a successive query or even successive queries, depend upon a result set of a prior query. Visualizing a single query in a user interface typically is of no consequence, but for visualizing multiple queries, the opposite is true.

Indeed, visualizing multiple queries in a single user interface view requires significant optimization of the user interface so that not only does each visualization for each query enjoy adequate screen space within the user interface, but also that the dependency relationship of each visualization is apparent. So much has proven ineffective to date. Thus, the end user is left in a state of confusion, unable to correlate the visualization of one query with one or more of its counterparts present. The result is a failure to holistically interpret the result sets of the various queries.

BRIEF SUMMARY OF THE INVENTION

Embodiments of the present invention address deficiencies of the art in respect to database query result set visualization of multiple database queries, and provide a novel and non-obvious method, system and computer program product for single view presentation of multiple query. In an embodiment of the invention, a method for single view presentation of multiple query includes directing a query against a database along a selected dimension of multiple different elements. In response, a primary result set is received. The result set is then organized into a tabular view of cells according to the selected dimension and values for the selected dimension. Thereafter, a set of nested queries may be directed for each of the elements in the selected dimension against the result set utilizing a different dimension. In a response to each directed set of nested queries, a corresponding result set is thus received. Finally, each corresponding result set is inserted into a cell associated with a common one of the elements.

In one aspect of the embodiment, a graph may be generated for each corresponding result set. Subsequently, the graph for each corresponding result set may be inserted into a cell associated with a common one of the elements.

In another aspect of the embodiment, a different set of nested queries may be directed for each of the elements in the selected dimension against the result set utilizing an additional dimension. In response to each directed different set of nested queries, a different corresponding result set is then received and a different graph generated for each corresponding different result set. Finally, the generated different graph for each corresponding different result set may be inserted into a cell associated with a common one of the elements.

Other aspects of the embodiment include limiting each corresponding result set to a maximum number of values.

Yet further aspects of the embodiment include directing the set of nested queries for each of the elements in the selected dimension against the result set utilizing a different dimension in response to a selection of a dimensionalization menu entry in a pop-up menu for the tabular view. In this regard, the dimensionalization menu entry upon selection may present a dialog box providing for a selection of a sort order of each corresponding result set.

In another embodiment of the invention, a data visualization data processing system is configured for single view presentation of multiple query. The system includes a host computing system with one or more computers, each with memory and at least one processor. The system also includes a database coupled to the host computing system and storing data therein. The system yet further includes a database visualization application executing in the memory of the host computing system and adapted to issue queries against the database and receive result sets in response to the queries. Finally, the system includes a single view dimensionalization module coupled to the application.

The module includes computer program instructions that when executing in the memory of the host computing system directs the database visualization application to query the database along a selected dimension of multiple different elements and receiving in response, a primary result set, organizes the result set into a tabular view of cells according to the selected dimension and values for the selected dimension, directs the database visualization application to perform a set of nested queries for each of the elements in the selected dimension against the result set utilizing a different dimension and receives in response to each directed set of nested queries, a corresponding result set. Finally, the program instructions insert each corresponding result set into a cell associated with a common one of the elements.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for single view presentation of multiple queries in a data visualization application. In accordance with an embodiment of the invention, a database query is formulated along a selected dimension of multiple different elements of data in a database and issued to a database management system of the database. In response, a primary result set for the query is received and organized into a tabular view of cells according to the selected dimension and those values for the selected dimension present in the result set. Thereafter, a set of nested queries may be directed for each of the elements in the selected dimension against the result set utilizing a different dimension of the multiple elements of data in the database. Consequently, a corresponding result set is received from the database management system for each one of the directed sets of nested queries.

Each corresponding result set then may be inserted into a cell associated with a common one of the elements of data in the database and preferably, a graph is generated for each corresponding result set and inserted into a cell associated with a common one of the elements in lieu of the insertion of the corresponding result set. In this way, a single tabular view of the multiple different result sets from multiple nested queries based upon the result set of prior queries may be arranged for viewing in one place presenting a large amount of data without the need for separate graphical views for each of the queries and while visually associating each nested result with a source query from the result had been derived.

Figure 1A:
FIGS. 1A and 1B, taken together, are a pictorial illustration of a process for single view presentation of multiple query in a data visualization application.

In further illustration, FIG. 1A pictorially shows a process for single view presentation of multiple query in a data visualization application. As shown in FIG. 1A, an instance 100A of a database exploration user interface is presented in connection with the visualization of data in a selected database. The instance 100A permits user interaction with a visualization configuration portion 110 of the instance 100A through which a dimension and a particular one of a set of measures 120 may be specified along with aggregation, sorting and limiting functions in formulating and directing execution of a query to the selected database. A result set for the executed query is then presented as a visualization 140 in a tabular view. The result set may be subjected to one or more filters 130 as shown herein.

Upon selection of a dimensionalization menu entry in the visualization configuration portion of the instance 110, a set of nested sub-queries for the result set may be specified including the specification of an additional dimension as can be seen. As well, one or more filters 150 further may be specified. In response to the dimensionalization directive, a sub-query consistent with the selected additional dimension is generated for each result set of the previously executed query presented as the visualization 140 in the tabular view. The sub-results may be subjected to additional aggregation such as a top N results, a sum, average or other such aggregation. Sub-results are received for each sub-query and optionally, a graphical representation of the sub-results is generated. Then, each of the graphical representations are included in an expanded form of the visualization 140 in a new instance 100B of the database exploration user interface, and in correspondence to a sub-result to which a sub-query for the graphical representation had been directed.

Figure 1B:
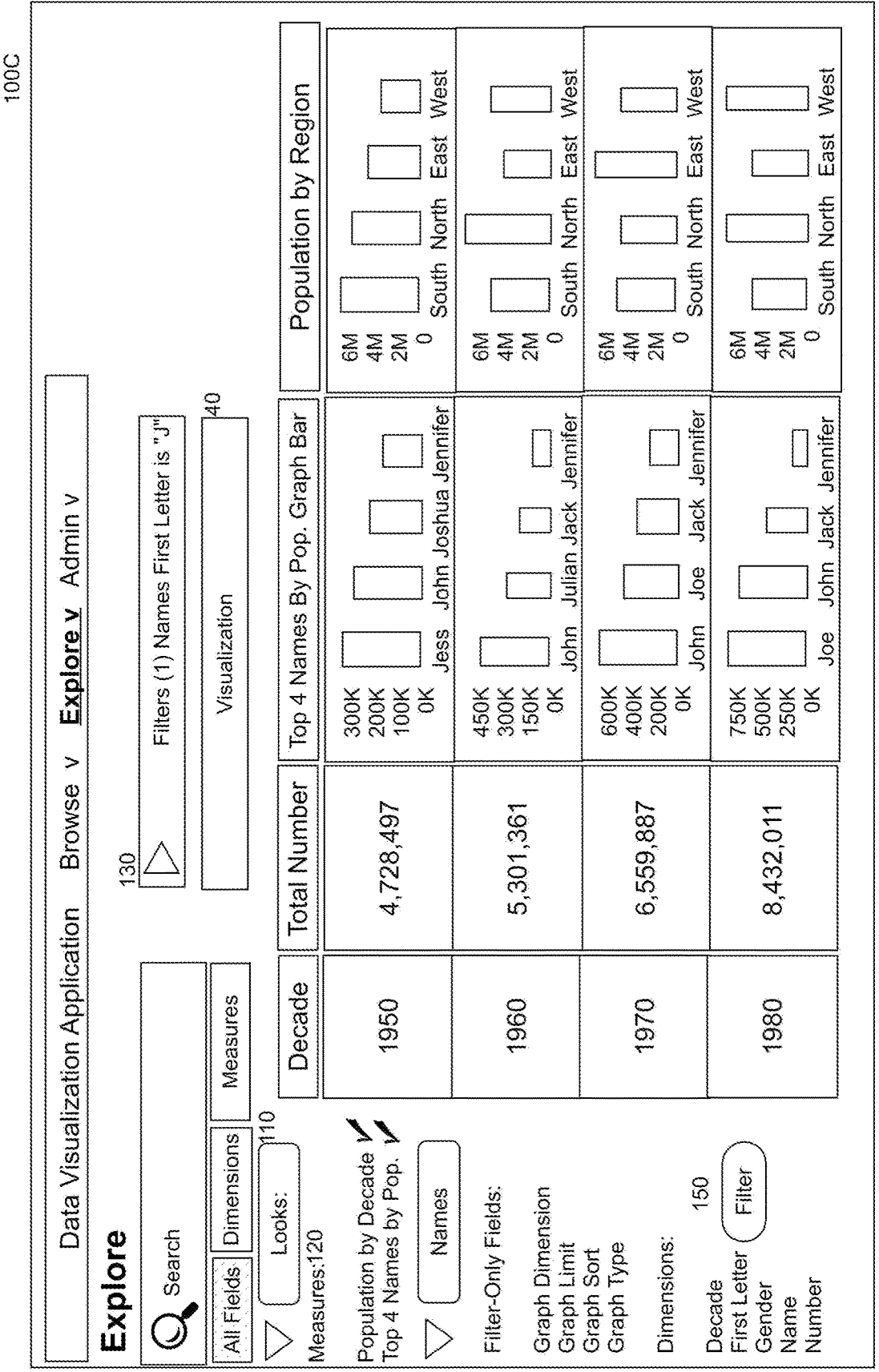

As it will be apparent, and as shown in FIG. 1B in respect to an instance 100C of the database exploration user interface, further nested sub-queries may be initiated by selecting yet additional dimensions when directing a dimensionalization of the result set of the original query, or any sub-queries thereafter. As well, each sub-query conducted as part of a dimensionalization may be filtered differently so as to produce different result sets which may be included in a different column of the tabular view of the instance 100B. Even further, graph for each sub-query conducted as part of a dimensionalization may be a result of a pivoted form of a prior query, but presented in a same row as a graph of the prior query. In this way, multiple different query views for multiple different measures of one or even two dimensions may be visualized in a single view with the relationship therebetween evident from the placement of each visualization in association with each other visualization relating to a common element of a result set of an initial query.

Figure 2:
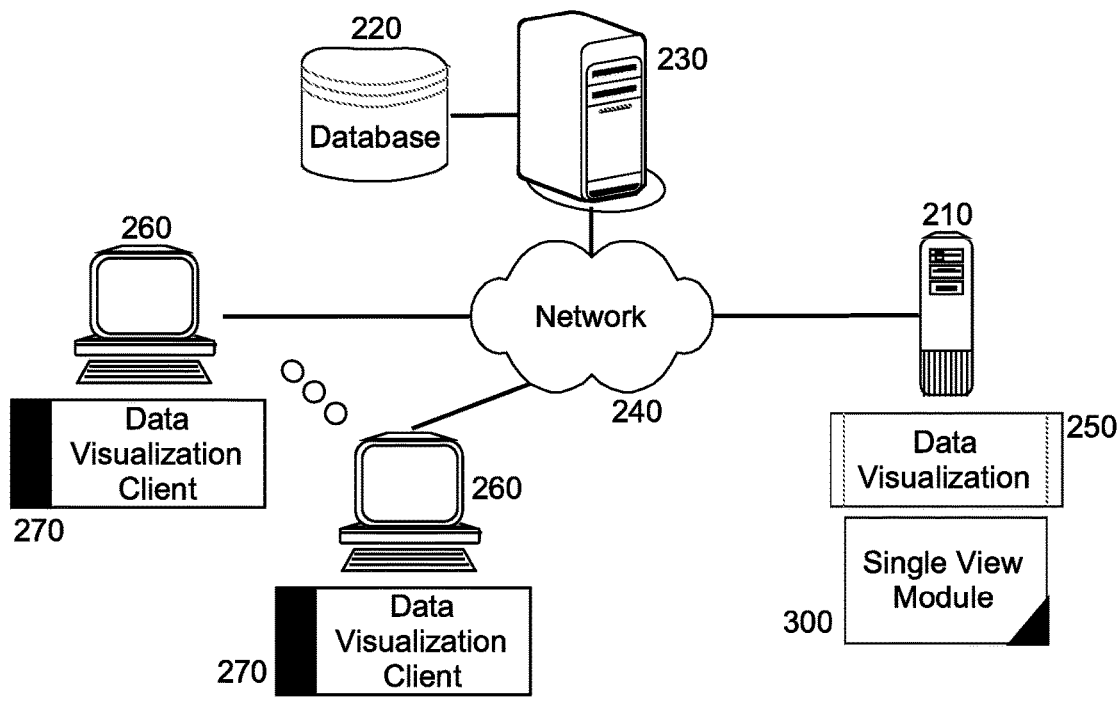
FIG. 2 is a schematic illustration of a data visualization computer data processing system adapted for single view presentation of multiple query; and, FIG. 3 is a flow chart illustrating a process for single view presentation of multiple query in a data visualization application.

The process shown in FIGS. 1A and 1B may be implemented within a data visualization computer data processing system. In yet further illustration, FIG. 2 schematically shows a data visualization computer data processing system adapted for single view presentation of multiple query. The system includes a host computing platform 210 of one or more computers, each with memory and at least one processor. The host computing platform 210 is coupled over computer communications network 240 to a database 220 managed by database management system executing in a separate computer 230. A data visualization application 250 executes in the memory of the host computing platform 210 and provides data visualization functionality to different client computers 260 over the computer communications network 240 by way of respectively different data visualization clients 270.

Of note, a single view module 300 is coupled to the data visualization application 250. The single view module 300 includes computer program instructions that when executing in the memory of the host computing platform 210 are enabled to receive an initial query specifying a dimension and measure for a specified table in the database 220, including by way of example, an aggregation function such as a sum, average or other aggregation. In consequence, the single view module 300 is enabled to direct the data visualization application 250 to transmit the query to the database management system 230 and to receive, in turn, an initial result set of records which may then be organized in a tabular view in which each row of the tabular view reflects a single record in the initial result set, and in which the rows are sorted according to a specified sort order of the query, and further in which the rows are limited to a specified number of records as set forth in the query.

The program instructions additionally are enabled to respond to a selection of a dimensionalization directive by identifying a different dimension within the directive and formulating a sub-query based upon the different dimension. As well, the program instructions execute the sub-query against each measure of the initial result set so as to produce a secondary result set for each measure—namely each record of the tabular view. Thereafter, a graph may be generated for each secondary result set for each measure in accordance with a graph type selection specified as part of the dimensionalization directive. Finally, the program code is enabled to augment the tabular view with a new column and to insert in each row of the new column, one of the generated graphs that corresponds to one of the measures of the initial result set for which the secondary result set reflected by the generated graph had been procured in consequence of the sub-query.

Figure 3:
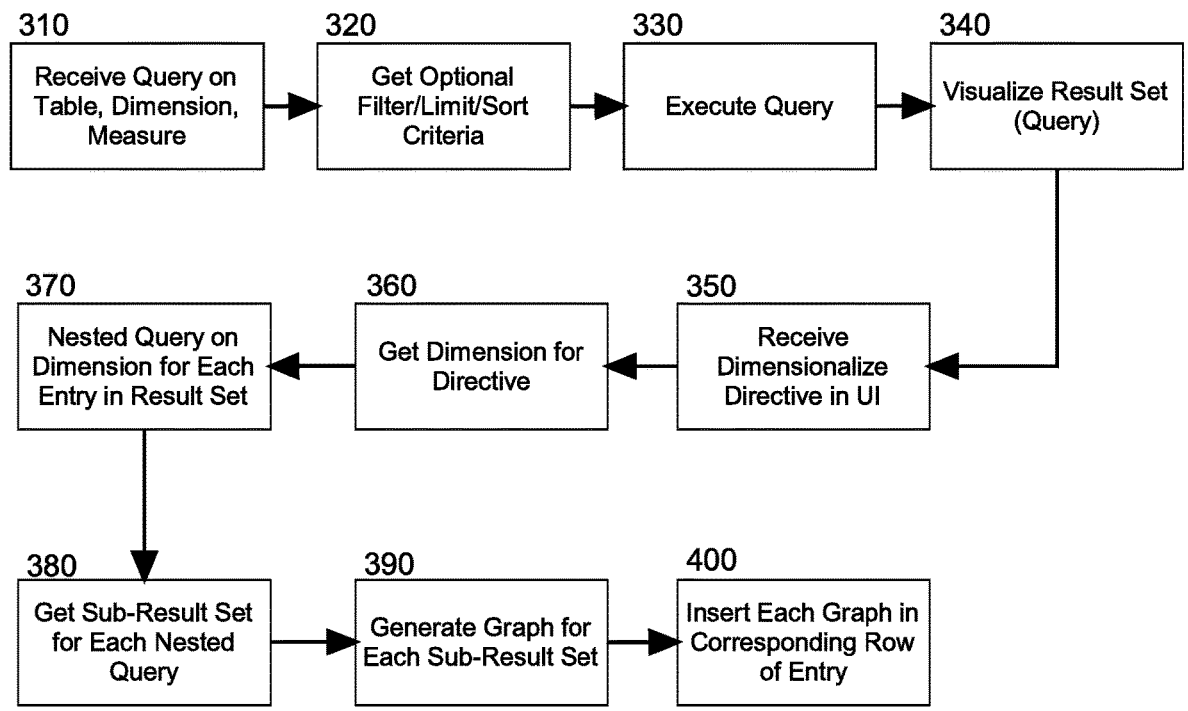

In even yet further illustration of the operation of the single view presentation module, FIG. 3 is a flow chart illustrating a process for single view presentation of multiple query in a data visualization application. Beginning in block 310, an initial query is received specifying a table, dimension and measure. In block 320, optionally, filter criteria, a record limit and/or a sorting criteria is determined in the initial query. In block 330, the initial query is then executed against a database specified in the initial query so that a result set is returned. In block 340, the result set is visualized in a tabular view of a set of records associating each record of the specified dimension with a corresponding measured value.

In block 350, a dimensionalization directive is received in a user interface to the data visualization application. In response, a dimension is determined for the directive and in block 370, a nested query is formed for each result in the initial result set. A secondary result set is then received in block 380 for each result of the initial result set. In block 390 a graph is generated for each secondary result set. Then, in block 400 each generated graph is inserted into a row of a cell of a new column of the tabular view corresponding to a result of the result set of the initial query common to the secondary result set of the secondary query.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for single view presentation of multiple query comprising:
    directing a query against a database along a first selected dimension of multiple different elements and receiving in response, a primary result set comprising selected dimension records and a corresponding value for each selected dimension record;
    organizing the selected dimension records and the corresponding values of the primary result set into a tabular view of cells according to the first selected dimension and the corresponding value for each selected dimension record;
    for each selected dimension record:
        directing a respective nested query against the database along a second selected dimension; and
        receiving, in response to the respective nested query, a corresponding result set; and
        inserting the corresponding result set into a cell of the tabular view associated with the selected dimension record.

2. The method of claim 1, further comprising, for each selected dimension record:
    generating a graph; and
    inserting the graph into a cell of the tabular view associated with the selected dimension record.

3. The method of claim 2, further comprising, for each selected dimension record:
    directing a second respective nested query against the database along a third selected dimension;
    receiving, in response to the second respective nested query, a second corresponding result set;
    generating a second graph; and
    inserting the generated second graph into a cell of the tabular view associated with the selected dimension record.

4. The method of claim 1, further comprising limiting each corresponding result set to a maximum number of values.

5. The method of claim 1, further comprising receiving the second selected dimension in response to a selection of a dimensionalization menu entry in a pop-up menu for the tabular view.

6. The method of claim 5, wherein the dimensionalization menu entry upon selection presents a dialog box providing for a selection of a sort order of each corresponding result set.

7. A data visualization data processing system configured for single view presentation of multiple query, the system comprising:
    a host computing system comprising one or more computers, each with memory and at least one processor;
    a database coupled to the host computing system and storing data therein;
    a database visualization application executing in the memory of the host computing system and adapted to issue queries against the database and receive result sets in response to the queries; and,
    a single view dimensionalization module coupled to the application and comprising computer program instructions that when executing in the memory of the host computing system perform:
        directing a query against a database along a first selected dimension of multiple different elements and receiving in response, a primary result set comprising selected dimension records and a corresponding value for each selected dimension record;
        organizing the selected dimension records and the corresponding values of the primary result set into a tabular view of cells according to the first selected dimension and the corresponding value for each selected dimension record;
        for each selected dimension record:
            directing a respective nested query against the database along a second selected dimension; and
            receiving, in response to the respective nested query, a corresponding result set; and
            inserting the corresponding result set into a cell of the tabular view associated with the selected dimension record.

8. The system of claim 7, wherein the program instructions further perform, for each selected dimension record:
    generating a graph; and
    inserting the graph into a cell of the tabular view associated with the selected dimension record.

9. The system of claim 8, wherein the program instructions further perform, for each selected dimension record:
    directing a second respective nested query against the database along a third selected dimension;
    receiving, in response to the second respective nested query, a second corresponding result set;
    generating a second graph; and
    inserting the generated second graph into a cell of the tabular view associated with the selected dimension record.

10. The system of claim 8, wherein the program instructions further perform limiting each corresponding result set to a maximum number of values.

11. The system of claim 8, wherein the program instructions further perform receiving the second selected dimension in response to a selection of a dimensionalization menu entry in a pop-up menu for the tabular view.

12. The system of claim 11, wherein the dimensionalization menu entry upon selection presents a dialog box providing for a selection of a sort order of each corresponding result set.

13. A computer program product for single view presentation of multiple query, the computer program product including a computer readable storage medium having program instructions embodied therewith, the program instructions executable by a device to cause the device to perform a method including:

directing a query against a database along a first selected dimension of multiple different elements and receiving in response, a primary result set comprising selected dimension records and a corresponding value for each selected dimension record;

organizing the selected dimension records and the corresponding values of the primary result set into a tabular view of cells according to the first selected dimension and the corresponding value for each selected dimension record;

for each selected dimension record:

directing a respective nested query against the database along a second selected dimension; and receiving, in response to the respective nested query, a corresponding result set; and inserting the corresponding result set into a cell of the tabular view associated with the selected dimension record.

14. The computer program product of claim 13, wherein the method further comprises, for each selected dimension record:

generating a graph; and inserting the graph into a cell of the tabular view associated with the selected dimension record.

15. The computer program product of claim 14, wherein the method further comprises, for each selected dimension record:

directing a second respective nested query against the database along a third selected dimension;

receiving, in response to the second respective nested query, a second corresponding result set;

generating a second graph; and inserting the generated second graph into a cell of the tabular view associated with the selected dimension record.

16. The computer program product of claim 13, wherein the method further comprises limiting each corresponding result set to a maximum number of values.

17. The computer program product of claim 13, wherein the method further comprises receiving the second selected dimension in response to a selection of a dimensionalization menu entry in a pop-up menu for the tabular view.

18. The computer program product of claim 17, wherein the dimensionalization menu entry upon selection presents a dialog box providing for a selection of a sort order of each corresponding result set.

* * * * *